United States Patent
Huang (10) Patent No.: US 8,278,251 B2
(45) Date of Patent: *Oct. 2, 2012

(54) FINES MIGRATION CONTROL AT THEIR SOURCES IN WATER RESERVOIRS

(75) Inventor: Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 541 days.

This patent is subject to a terminal disclaimer.

(21) Appl. No.: 12/502,873

(22) Filed: Jul. 14, 2009

(65) Prior Publication Data

US 2009/0312204 A1    Dec. 17, 2009

Related U.S. Application Data

(63) Continuation-in-part of application No. 12/277,825, filed on Nov. 25, 2008, which is a continuation-in-part of application No. 11/931,706, filed on Oct. 31, 2007.

(51) Int. Cl.
*C09K 8/74* (2006.01)
(52) U.S. Cl. ........ 507/265; 507/269; 166/266; 166/268; 166/279; 166/285
(58) Field of Classification Search ................ 507/265, 507/269; 166/279, 285, 266, 268
See application file for complete search history.

(56) References Cited

U.S. PATENT DOCUMENTS

| | | | |
|---|---|---|---|
| 3,208,528 A * | 9/1965 | Elliott et al. | 166/305.1 |
| 3,741,308 A * | 6/1973 | Veley | 166/292 |
| 5,160,642 A | 11/1992 | Schield et al. | |
| 5,518,996 A | 5/1996 | Maroy et al. | |
| 6,422,314 B1 | 7/2002 | Todd et al. | |
| 7,081,439 B2 | 7/2006 | Sullivan et al. | |
| 7,131,491 B2 | 11/2006 | Blauch et al. | |
| 7,204,311 B2 | 4/2007 | Welton et al. | |
| 7,258,170 B2 | 8/2007 | Nguyen et al. | |
| 7,284,610 B2 | 10/2007 | Poelker et al. | |
| 7,328,745 B2 | 2/2008 | Poelker et al. | |
| 7,527,102 B2 | 5/2009 | Crews et al. | |

(Continued)

FOREIGN PATENT DOCUMENTS

WO    2008036812 A2    3/2008

OTHER PUBLICATIONS

Schlumberger Oilfield dictionary definition of waterflood, printed Dec. 8, 2011.*

(Continued)

*Primary Examiner* — Alicia Toscano
(74) *Attorney, Agent, or Firm* — Mossman Kumar & Tyler PC (57) ABSTRACT

Water flood materials may contain an effective amount of a nano-sized particulate additive to inhibit or control the movement of fines within a subterranean formation during a water flood secondary recovery operation. The particulate additive may be an alkaline earth metal oxide, alkaline earth metal hydroxide, alkali metal oxide, alkali metal hydroxide, transition metal oxide, transition metal hydroxide, post-transition metal oxide, post-transition metal hydroxide, piezoelectric crystal, and/or pyroelectric crystal. The particle size of the magnesium oxide or other agent may be nanometer scale, which scale may provide unique particle charges that help control and stabilize the fines, e.g. clays.

6 Claims, 4 Drawing Sheets

U.S. PATENT DOCUMENTS

| | | |
|---|---|---|
| 7,543,644 B2 | 6/2009 | Huang et al. |
| 7,543,646 B2 | 6/2009 | Huang et al. |
| 7,550,413 B2 | 6/2009 | Huang et al. |
| 7,601,675 B2 | 10/2009 | Poelker et al. |
| 7,721,803 B2 * | 5/2010 | Huang et al. ............ 166/278 |
| 2005/0107265 A1 | 5/2005 | Sullivan et al. |
| 2005/0252658 A1 | 11/2005 | Willingham et al. |
| 2006/0086501 A1 | 4/2006 | Creel et al. |
| 2006/0113080 A1 | 6/2006 | Nguyen et al. |
| 2007/0036977 A1 | 2/2007 | Sinclair et al. |
| 2007/0066491 A1 | 3/2007 | Bicerano et al. |
| 2007/0104923 A1 | 5/2007 | Whitaker et al. |
| 2007/0151726 A1 | 7/2007 | Crews et al. |
| 2008/0023201 A1 | 1/2008 | Huang et al. |
| 2008/0051302 A1 | 2/2008 | Crews et al. |
| 2008/0060812 A1 | 3/2008 | Huang et al. |
| 2008/0087429 A1 | 4/2008 | Brannon et al. |
| 2008/0099207 A1 | 5/2008 | Venditto et al. |
| 2008/0132711 A1 | 6/2008 | Poelker et al. |
| 2008/0220995 A1 | 9/2008 | Huang et al. |
| 2008/0248978 A1 | 10/2008 | Huang et al. |
| 2009/0107673 A1 * | 4/2009 | Huang et al. ............ 166/280.2 |
| 2009/0111718 A1 | 4/2009 | Gadiyar et al. |
| 2009/0312201 A1 * | 12/2009 | Huang et al. ............ 507/265 |
| 2011/0000672 A1 * | 1/2011 | Huang ............ 166/308.1 |

OTHER PUBLICATIONS

Y. Taguchi et al., "Preparation of find composite particles composed of inorganic solid powders and organic polymers by utilizing liquid-liquid dispersion," Colloids and Surfaces A: Physiochemical and Engineering Aspects, vol. 153, 1999, pp. 401-404 (XP002530896).

J. Hibbeler et al.; "An Integrated Long-Term Solution for Migratory Fines Damages," SPE 81017, SPE Latin American and Caribbean Petroleum Engineering Conference, Apr. 27-30, 2003, Port-of-Spain, Trinidad, West Indies, pp. 1-11.

P. D. Nguyen et al.; "Controlling Formation Fines at Their Sources to Maintain Well Productivity," SPE 96759, SPE International Improved Oil Recovery Conference in Asia Pacific, Kuala Lumpur, Dec. 5-6, 2005; republished SPE Production & Operations, May 2007, pp. 202-215.

* cited by examiner

FIG. 5 - Pressure drop comparison for 20/40 mesh (850/425 micron) sand pack at 10ml/min of 5%KCl

FINES MIGRATION CONTROL AT THEIR SOURCES IN WATER RESERVOIRS

CROSS-REFERENCES TO RELATED APPLICATIONS

This application is a continuation-in-part application from U.S. Ser. No. 12/277,825 filed Nov. 25, 2008 which in turn is a continuation-in-part application from U.S. Ser. No. 11/931,706 filed Oct. 31, 2007.

TECHNICAL FIELD

The present invention relates to methods and compositions for water flooding during secondary hydrocarbon recovery operations, and more particularly relates, in one non-limiting embodiment, to methods and compositions for reducing or controlling fines migration during water flooding subterranean formations in secondary recovery operations.

BACKGROUND

Water flooding is a conventional method of enhancing oil recovery for reservoirs. In this method, water is injected into underground formation through injection wells and oil or other hydrocarbon is driven by the water toward and produced in production wells. When water flows into pores of the media in the formation occupied by the oil, clays and other formation fines are released and flowed with the injection water. The released formation particles may accumulate and plug the pore throats in the flow channels, which causes lower water sweep efficiency and reduced oil recovery.

Normally, these fines, including the clays, are quiescent, causing no obstruction of flow to the wellbore via the capillary system of the formation. However, when the fines are disturbed, they begin to migrate in the production stream and, too frequently, they encounter a constriction in the capillary where they bridge off and severely diminish the flow rate.

A phenomenon that disturbs the quiescent clays and fines is often the introduction of water foreign to the formation. The foreign water is often fresh or relatively fresh water compared to the native formation brine. As noted, the water is frequently intentionally introduced such as for purposes of water flooding.

Sometimes the loss of permeability is due to clay swelling with relatively fresh water without migration of the clay particles, although, often clay swelling is accompanied by migration of clays and fines. Sometimes non-swelling clays can respond to the foreign water and begin to migrate. It is believed that swelling clays are the major mechanism of fines migration and/or swelling, because when formation cores are analyzed, the presence of swelling clays are an excellent indicator that the formation will be sensitive to foreign water intrusion, while the presence of non-swelling clays only is inconclusive.

Generally, swelling clays are in the smectic group including clay minerals such as montmorillonite, beidellite, nontronite, saponite, hectorite, and sauconite. Of these, montmorillonite is the clay mineral found most commonly in formation core analysis. Montmorillonite is commonly associated with clay minerals known as mixed-layer clays.

Migrating fines include a host of clay and other minerals in minute particle size, for example, feldspars, fine silica, kaolinite, allophane, biotite, talc, illite, chlorite and the swelling clays themselves. Further information is found in U.S. Pat. No. 5,160,642, incorporated by reference herein in its entirety.

Clays can also cause trouble in areas other than permeability reduction. When they are a component in shales, sandstones, or other formations, contact with a foreign water or at times with any water can cause the formation to lose strength or even disintegrate. This is a problem in building foundations, road beds, drilling wells, enhanced oil recovery and any situation where the formation strength is important.

There have been numerous attempts to control the ill effects of water on clay and/or other fines. These efforts have been principally in the oil exploration and production industry. One idea is to convert the clay from the swelling sodium form or the more rare swelling lithium form to another cation form which does not swell as much.

In other approaches, a number of materials have been used as sacrificial materials to plate or coat the clays and protect them from the degradation caused by contact with water and caustic which is often used in the water flood material. A surface active agent is often included with the water in secondary production and well treatment. When such surfactants are used, they often adhere to the clay surfaces and build up a plurality of layers, thus being effectively removed from the water flood material and lost, causing an economic disadvantage requiring more surfactant to be added to the subsurface formation than would be necessary. Sugars have also been used as sacrificial materials for nonionic surfactants to coat, or plate, on clay and sand particles by hydrogen bonding to the oxide surfaces. However, since the —OH group is polar, the sugars tend to layer up on the oxide surfaces. Furthermore, the sugars alone do not effectively plate or coat the edges of the clay platelets, so that complete protection of the clays is not obtained.

Accordingly, it would be desirable to provide a composition and method that would provide a high degree of stabilization and control of fines migration, particularly those in subterranean formations.

SUMMARY

There is provided, in one form, a method for recovering a hydrocarbon from a subterranean formation that involves injecting water flood materials into a bore hole in communication with a hydrocarbon-bearing subterranean formation. The water flood materials include a particulate additive having a mean particle size of 100 nm or less. The particulate additives include, but are not necessarily limited to alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals. The amount of particulate additive is effective to inhibit the migration of fines in the subterranean formation as compared to water flood materials absent the particulate additive. Of course, the water flood materials would also include water.

In the particulate additive, a suitable alkaline earth metal may be magnesium, calcium, strontium, and/or barium. A suitable alkali metal may be lithium, sodium, and/or potassium. A suitable transition metal may be titanium and/or zinc. A suitable post-transition metal may be aluminum. Mixtures of these particulate additives are also suitable. The treated clays in the formation are thus inhibited from expansion as compared with introducing an identical fluid into the subterranean formation absent the particulate additive.

The particulate additives, also referred to herein as nano-sized particles or nanoparticles (e.g. MgO and/or Mg(OH)$_2$, and the like), appear to bind to, associate with or flocculate the fines, e.g. clays and clay particles, including charged and non-charged particles, both expanding clays and non-expanding clays. Due to at least in part to their small size, the surface forces (like van der Waals and electrostatic forces) of nanoparticles help them associate the fines at their original locations. Such associations help fix the clays in place and keep them from swelling and/or moving. In many cases, the ability of the treating fluids to stabilize clays may be improved by use of nano-sized particulate additives that may be much smaller than the pores and pore-throat passages within a hydrocarbon reservoir, thereby being non-pore plugging particles that are much less damaging to the reservoir permeability than the clays themselves. This smaller size permits the nanoparticles to readily enter the formation with the water flood materials, and then stabilize the clays in place so that both the clays and the nanoparticles remain in the formation and do not travel as far—or at least are restrained to the point that reduction of water sweep efficiency and reduced oil recovery is minimized. In one non-limiting embodiment, the fines are held or stabilized at or near their sources or origins in the reservoir.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to water flood fluid (typically an aqueous fluid) which is then introduced into a subterranean formation is expected to control, prevent or inhibit the migration of fines and the swelling of clays in the subterranean formation to stabilize them, and prevent or minimize the damage they may cause to the formation permeability.

DETAILED DESCRIPTION

It has been discovered that nanoparticles (nanometer-sized particles) are useful for subterranean formation fines control and stabilization. Water with low concentration nanoparticles, such as 0.5% bw of 35 nm MgO in water, may be pumped from injection wells in a hydrocarbon reservoir toward producing wells. As the water drives the hydrocarbons toward the production wells, the nanoparticles will fixate formation fines, such as swelling and non-swelling clays, at their sources or origins in the water flow channels. Without wishing to be limited to any particular explanation or mechanism, it is theorized that the surface forces of nanoparticles, such as van der Waals and electrostatic forces, hold, inhibit or otherwise restrain the formation fines from swelling and/or moving. Water sweep efficiency is not decreased. When the water breaks through to the producing wells, there are few fines accumulating at or near the wellbore region of producers to choke the production of hydrocarbons. Laboratory tests show that the effluent of sand pack containing nanoparticles is cleaner than that of containing no nanoparticles, and that the pressure drop across sand pack containing nanoparticles is less than that of sand packs containing no nanoparticles under same flow rate of 5% KCl brine.

Fines swelling and/or migrating have been troublesome during well drilling and completion, oil and gas production, as well as during secondary recovery operations such as water flooding. The clays most frequently found in the underground oil and gas bearing formation include bentonite (montmorillonite) group, illite group, kaolinite group, chlorite group, and the mixtures of them.

It has been discovered that nano-sized particles like magnesium oxide (MgO) may be used to stabilize clays in subterranean hydrocarbon formations to inhibit, restrain or prevent them from swelling and/or migrating to near-wellbore regions to choke or damage the production of hydrocarbons. Some nano-sized particles, also called nanoparticles herein, not only have high surface areas compared to their small sizes, but also have relatively high surface charges that permit them to associate with or connect other particles together, including other charged particles, but also other non-charged particles. In one non-limiting explanation, these associations or connections between the clays and the nano-sized particles may be due to electrical attractions and other intermolecular forces or effects.

As will be shown, laboratory tests have demonstrated that relatively small amounts of MgO nanoparticles can stabilize dispersed clay particles. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein. The nanoparticles may be pumped with a carrier fluid downhole deep within the formation to contact and treat the clays.

In more detail, nano-sized particles of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof have been discovered to have particular advantages for stabilizing clays and inhibiting or preventing their undesired migration, rather than allowing them to choke off the pores and reduce water sweep efficiency and/or reduce hydrocarbon recovery.

In particular, magnesium oxide particles and powders have been suitably used to stabilize clays herein. However, it will be appreciated that although MgO particles are noted throughout the description herein as one representative or suitable type of alkaline earth metal oxide particle, other alkaline earth metal oxides and/or alkaline earth metal hydroxides and/or transition metal oxides, transition metal hydroxides, post-transition metal oxides, post-transition metal hydroxides, piezoelectric crystals, and pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, PbZrTiO3, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. ZnO and these other crystals are generally not water soluble.

In one non-limiting explanation, when the aqueous water flood materials mixed with very small pyroelectric crystals, such as nano-sized ZnO, are pumped downhole into underground formations that are under high temperature and/or pressure, the pyroelectric crystals are heated and/or pressed and high surface charges are generated. These surface charges permit the crystal particles to associate, link, connect or otherwise relate the fines together to fixate them together and also to bind or associate them with the surrounding formation surfaces. The association or relation of the fines is thought to be very roughly analogous to the crosslinking of polymer molecules by crosslinkers, in one non-limiting image. No formation damage is expected from the use of the nano-sized particulate additives.

In one non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the additives and agents ranges between about 1 nanometer independently up to about 500 nano-meters. In another non-limiting embodiment, the particle size ranges between about 4 nanometers independently up to about 100 nanometer. In another non-restrictive version, the particles may have a mean particle size of about 100 nm or less, alternatively about 90 nm or less, and in another possible version about 50 nm or less, alternatively 40 nm or less.

The amount of nano-sized particles in the water flood materials may range from about 0.001% to about 0.5% by weight (bw). Alternatively, the lower threshold of the proportion range may be about 0.05% bw, whereas the upper threshold may independently be about 1.0% bw.

The nano-sized particles herein may be added along with the water flood materials prior to pumping downhole or other application. The aqueous water flood materials could be, for example, fresh water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid (for completing a well) or other application, for a non-limiting example.

More specifically, and in non-limiting embodiments, the brines may be prepared using salts including, but not necessarily limited to, NaCl, KCl, $NH_4Cl$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water, although in many water flooding applications the salt concentration may be 1 wt % or less. The brine may be a combination of one or more of the mentioned salts, such as a brine prepared using NaCl and KCl or NaCl, as non-limiting examples. In application, the nano-sized particulate additives of MgO (or other particulate) may be mixed with the carrier fluids at the surface before they are pumped downhole.

The base fluid may also contain other conventional additives common to the well service industry such as water wetting surfactants, surface active agents and other sacrificial agents, materials to convert the clays from swelling forms to relatively non-swelling forms, sugars and the like. In another non-restrictive embodiment, the treatment fluid may contain other additives including, but not necessarily limited to, viscosifying agents, other different surfactants, scale inhibitors, scale dissolvers, polymer and biopolymer degradation additives, defoamers, biocides, and other common and/or optional components.

The invention will be further described with respect to the following Examples which are not meant to limit the invention, but rather to further illustrate the various embodiments.

EXAMPLE 1

A comparison was conducted between two different fluids of the following compositions:

| | |
|---|---|
| Fluid A: | 0.5% bw natural bentonite in DI water |
| Fluid B: | 0.5% bw natural bentonite in DI water, including 0.5% bw MgO nanoparticles (crystallite size ≦8 nm; specific surface area ≧230 m²/g). |

Fluid A simulates a conventional aqueous fluid where clay particles are dispersed therein. Fluid B is Fluid A additionally with nanoparticles of the methods and compositions, as defined above.

Figure 1A:
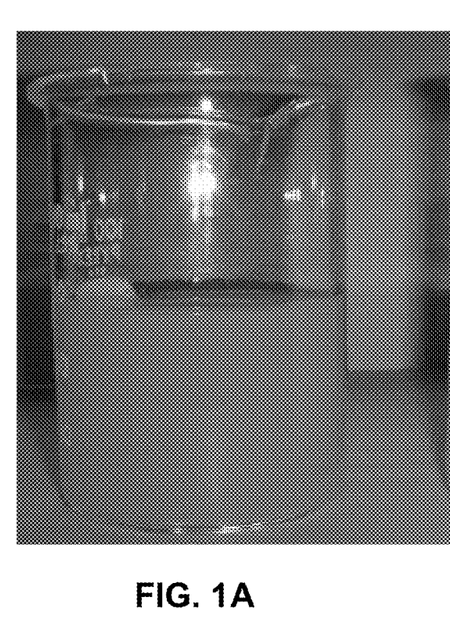
FIG. 1A is the left side of a photograph of a beaker of 0.5% by weight (bw) natural bentonite in 50 mls deionized (DI) water to simulate a swelling clay in water, immediately after stirring for two minutes.
Figure 1B:
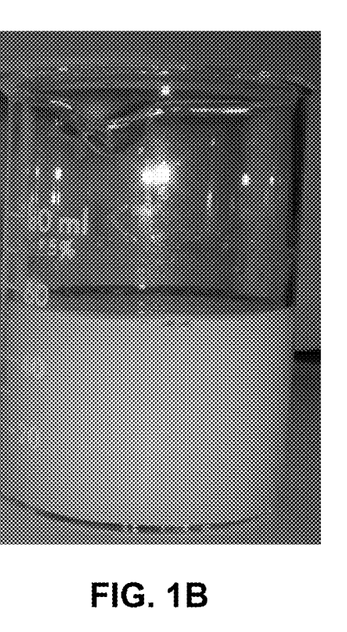
FIG. 1B is the right side of a photograph of a beaker of 0.5% bw natural bentonite in 50 mls DI water to simulate a swelling clay in water, as in FIG. 1A, but also containing 0.5% bw MgO particles (crystallite size ≦8 nm; specific surface area ≧230 $m^2/g$) immediately after stirring for two minutes.

As a clay expanding test, 50 mls of both Fluid A and Fluid B were stirred in glass beakers for two minutes, and then they were left to settle without further agitation. Photographs were taken at time intervals. FIG. 1 herein presents both beakers immediately after stirring with Fluid A (without nanoparticles) on the left side (FIG. 1A) and Fluid B (with nanoparticles) on the right side (FIG. 1B). From this photograph, it may be seen that all particles are still dispersed in both Fluids A and B immediately after mixing.

Figure 2A:
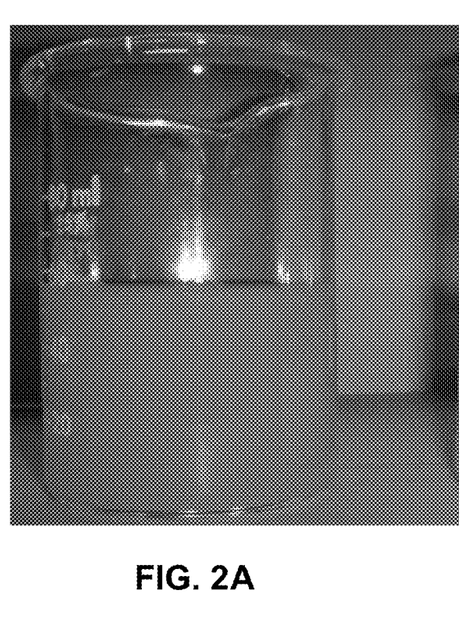
FIG. 2A is the left side of a photograph showing the beaker in FIG. 1A 20 minutes after stirring has ceased.
Figure 2B:
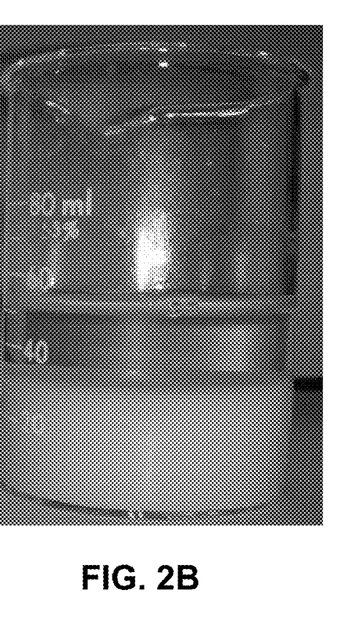
FIG. 2B is the right side of a photograph showing the beaker in FIG. 1B 20 minutes after stirring has ceased.

The photograph in FIG. 2 was taken 20 minutes after stirring ceased. There is already a dramatic difference between the two fluids. Fluid A on the left in FIG. 2A shows that the suspended clay particles are still uniformly dispersed throughout the Fluid A, whereas Fluid B containing the nanoparticles in FIG. 2B on the right demonstrates that all particles are beginning to settle out.

Figure 3A:
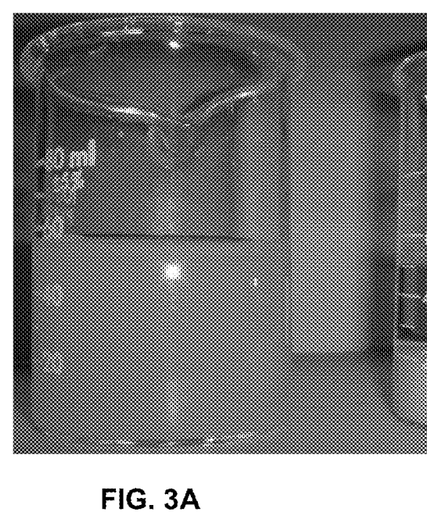
FIG. 3A is the left side of a photograph showing the beaker in FIG. 1A 60 minutes after stirring has ceased.
Figure 3B:
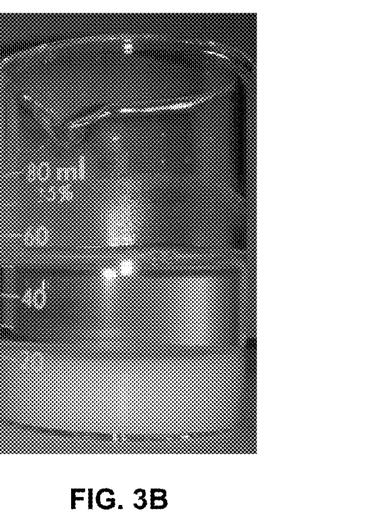
FIG. 3B is the right side of a photograph showing the beaker in FIG. 1B 60 minutes after stirring has ceased.

The photograph in FIG. 3 was taken 60 minutes (1 hour) after stirring ceased. It may be seen that the suspended clay particles in Fluid A on the left in FIG. 3A are still uniformly dispersed, whereas all of the particles in Fluid B containing the nanoparticles, shown on the right in FIG. 3B have completely settled out. Example 1 thus demonstrates that the nanoparticles in Fluid B inhibited the clay particles from expanding and remaining dispersed in the fluid.

EXAMPLE 2

20/40 mesh (850/425 micron) sand alone, the sand mixed with 1% bw bentonite and 1% bw illite, and the sand mixture of with 1% bw bentonite and 1% bw illite containing 0.4% bw nanoparticles were vertically packed in separate one-inch (2.5 cm) ID and 12-inch (30.5 cm) long acrylic tubes with 100 mesh (149 micron) screens at both ends. The acrylic tube has a 0.125 inch (3.2 mm) outlet orifice at each end. A separate pressure differential transducer was mounted at both ends of each tube. 5% bw KCl water was pumped at 10 ml/min through each pack and each pressure differential was recorded. The $D_{50}$ of the bentonite is 39 microns and $D_{90}$ 142 microns. The $D_{50}$ of the illite is 16 microns and $D_{90}$ 90 microns.

Figure 4:
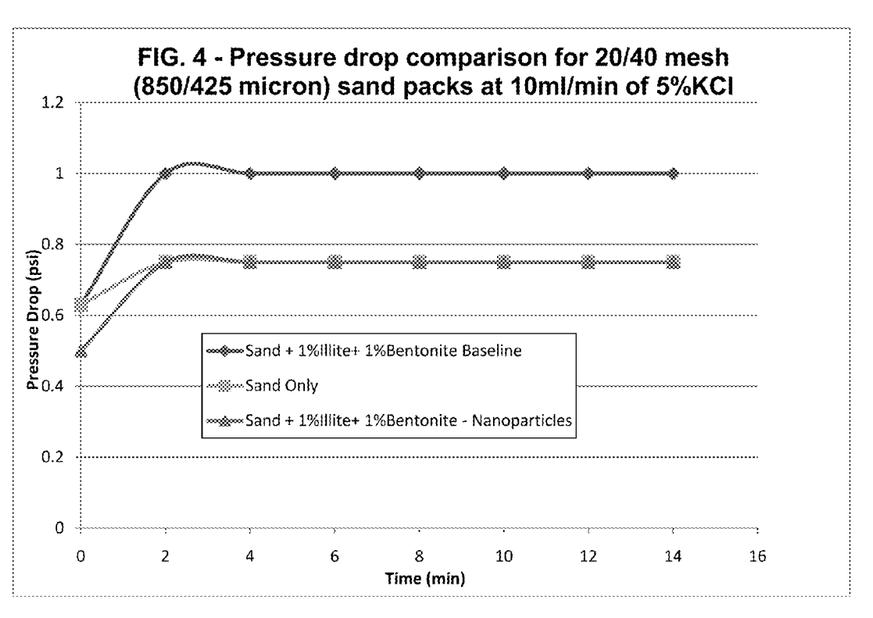
FIG. 4 is a graph presenting a pressure drop comparison as a function of time for 20/40 mesh (850/425 micron) sand packs at 10 ml/min of 5% KCl for sand only (curve with squares), the same size sand with 1% bw (of 20/40 mesh sand) illite and 1% bw (of 20/40 mesh sand) bentonite clays (curve with diamonds), and then the same size sand with 1% bw illite, 1% bw bentonite clays and 0.4% bw (of 20/40 mesh sand) nanoparticles (curve with triangles)

The sand pack tests were conducted and demonstrated that the pressure drop of 5% bw KCl water flowing through the pack containing 0.4% bw nanoparticles (magnesium oxide with an average particle size of 35 nm) is much lower than that of the same sand pack containing no nanoparticles at the same flow rate, and is almost the same as a pack having only sand. Both sand packs contain the same amount of natural bentonite and illite (1 percent bentonite and 1 percent illite). These results are shown in FIG. 4.

EXAMPLE 3

Figure 5:
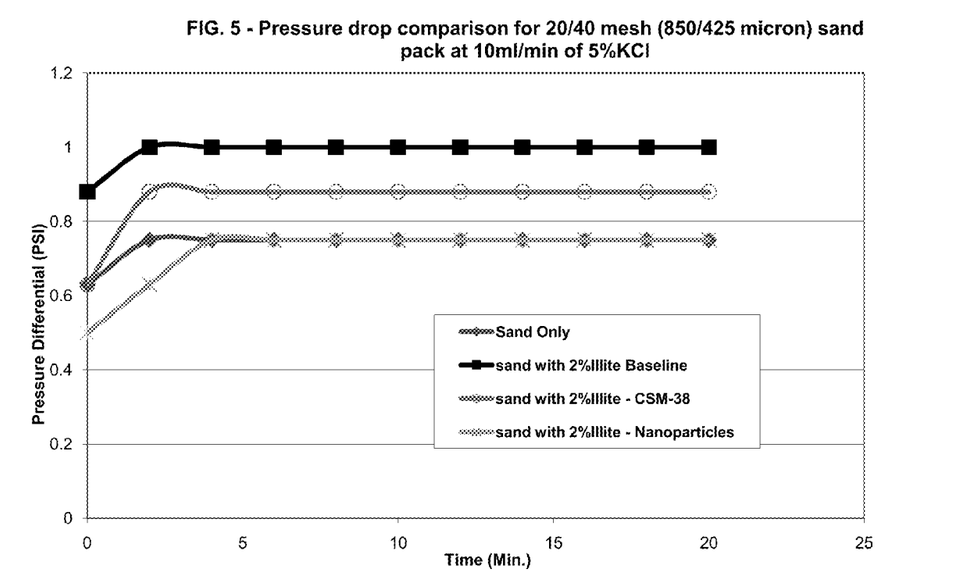
FIG. 5 is a graph presenting a pressure drop comparison as a function of time for 20/40 mesh (850/425 micron) sand packs at 10 ml/min of 5% KCl for sand only (curve with diamonds), sand with 2% bw (of 20/40 mesh sand) illite clays (curve with squares), then the same size sand with 2% bw illite and 0.4% bw (of 20/40 mesh sand) nanoparticles (curve with stars), and 5% KCl with 2% CSM-38 clay control additive from CESI Chemical flowing through the sand with 2% bw (of 20/40 mesh sand) illite clays (curve with circles)

Similar sand packs were made as Example 2. FIG. 5 shows the similar results as FIG. 4 for the sand packs containing 2% bw illite with and without 0.4% bw nanoparticles. FIG. 5 also shows that the pressure drop of 5% bw KCl water flowing through the pack containing 0.4% bw nanoparticles (magnesium oxide with an average particle size of 35 nm) is lower than that of 5% bw KCl and 2% bw CSM-38 (a polyquat amine based clay control additive from CESI Chemical) solution flowing through the same sand pack containing no nanoparticles at the same flow rate.

EXAMPLE 4

Rev Dust, a natural mixture of clays and fines, was used to replace bentonite and illite in Example 2 and 3 for sand pack tests. The $D_{50}$ of the Rev Dust is 18 microns and $D_{90}$ 60 microns. It contains 12% quartz, 7% cristobalite, 4% illite, 29% mixed layers (bentonite), 26% kaolinite, and 22% chlorite. 2% bw Rev Dust was mixed with 20/40 mesh (850/425 micron) sand with and without 0.4% nanoparticles to build 12-inch (about 30 cm) long sand packs. 5% bw KCl water was pumped through the packs at different flow rates and pressure drops were recorded accordingly in the following Table I, which shows that the pressure drop of sand pack with nanoparticles is lower than that of sand pack without nanoparticles.

TABLE I

| | Pressure Drop, psi (KPa) | | | |
|---|---|---|---|---|
| | 2 ml/min | 5 ml/min | 10 ml/min | 15 ml/min |
| With nanoparticles | 0.71 (4.9) | 0.76 (5.2) | 0.84 (5.8) | 0.94 (6.5) |
| Without nanoparticles | 0.78 (5.4) | 0.84 (5.8) | 0.95 (6.6) | 1.09 (7.5) |

EXAMPLE 5

Figure 6:
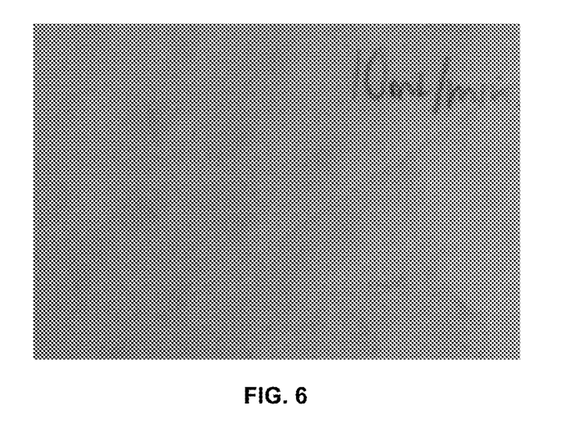
FIG. 6 is a photograph of filter paper into which had been flowed the effluent of water from a sand pack at 10 ml/min, where the sand pack contained nanoparticles as described herein.
Figure 7:
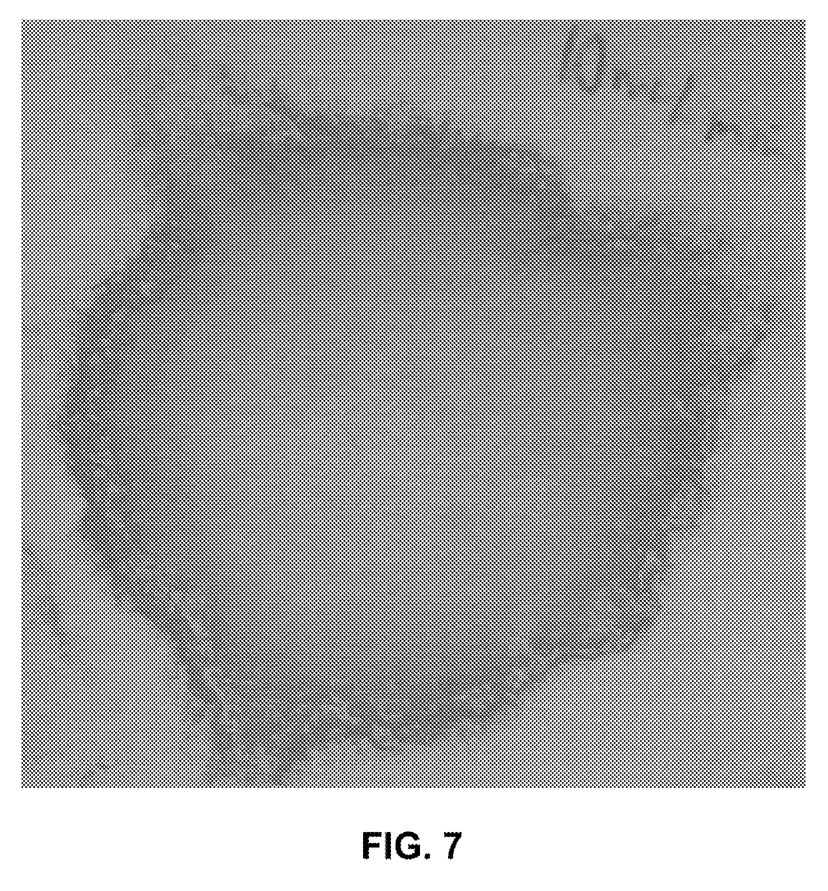
FIG. 7 is a photograph of filter paper into which had been flowed the effluent of water from a sand pack at 10 ml/min, where the sand pack did not contained nanoparticles showing the filter paper containing "fines" collected thereon not contained by the nanoparticles within the sand pack.

Laboratory tests showed that the effluent of a sand pack containing 35 nm MgO nanoparticles is cleaner than that of an identical sand pack containing no nanoparticles using a flow rate of 5% KCl brine of 10 ml/min. FIG. 7 is a photograph of filter paper having the effluent of the sand pack without the nanoparticles passed therethrough, whereas FIG. 6 is a photograph of filter paper after having the effluent of the sand pack with the nanoparticles having passed therethrough. It may be readily seen that the filter paper of FIG. 6 is cleaner than that of FIG. 7.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes, brines, and other components falling within the claimed parameters, but not specifically identified or tried in a particular method or composition, are anticipated to be within the scope of this invention. Further, water flood materials other than those explicitly described or exemplified are expected to be useful in the methods of the claimed invention.

The words "comprising" and "comprises" as used throughout the claims is to be interpreted "including but not limited to".

The present invention may suitably comprise, consist or consist essentially of the elements disclosed and may be practiced in the absence of an element not disclosed.

What is claimed is:

1. A method for recovering a hydrocarbon from a subterranean formation comprising:
   injecting water flood materials into a bore hole that is part of an injection well in communication with a hydrocarbon-bearing subterranean formation, where:
       the water flood materials comprise a solid, particulate additive that:
           has a mean particle size of 100 nm or less, and
           is selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof, and
       the amount of solid, particulate additive is effective to inhibit the migration of fines in the subterranean formation as compared to water flood materials absent the solid, particulate additive;
   transporting the water flood materials through at least a portion of the subterranean formation;
   contacting the hydrocarbon in the subterranean formation; and
   recovering at least a portion of the hydrocarbon from the subterranean formation via a production well.

2. The method of claim 1 where the amount of solid, particulate additive in the water flood materials ranges from about 0.001% to about 0.5% by weight.

3. The method of claim 1 where:
   the alkaline earth metal is selected from the group consisting of magnesium, calcium, strontium, barium, and mixtures thereof,
   the alkali metal is selected from the group consisting of lithium, sodium, potassium, and mixtures thereof,
   the transition metal is selected from the group consisting of titanium, zinc, and mixtures thereof and
   the post-transition metal is aluminum.

4. The method of claim 1 where the mean particle size of the solid, particulate additive is 90 nm or less.

5. A method for recovering a hydrocarbon from a subterranean formation comprising:
   injecting water flood materials into a bore hole that is part of an injection well in communication with a hydrocarbon-bearing subterranean formation, where the water flood materials comprise from about 0.001% to about 0.5% by weight, based on the water flood materials, of a solid, particulate additive:
   having a mean particle size of 100 nm or less,
   that is selected from the group consisting of:
       alkaline earth metal oxides and alkaline earth metal hydroxides, where the alkaline earth metal is selected from the group consisting of magnesium, calcium, strontium, and barium;
       alkali metal oxides and alkali metal hydroxides, where the alkali metal is selected from the group consisting of lithium, sodium, and potassium;
       transition metal oxides and transition metal hydroxides, where the transition metal is selected from the group consisting of titanium and zinc;
       aluminum oxides, aluminum hydroxides;
       piezoelectric crystals, pyroelectric crystals, and mixtures thereof;
   transporting the water flood materials through at least a portion of the subterranean formation;
   contacting the hydrocarbon in the subterranean formation; and
   recovering at least a portion of the hydrocarbon from the subterranean formation via a production well.

6. The method of claim 5 where the mean particle size of the solid, particulate additive is 90 nm or less.

* * * * *